United States Patent [19]

Fowler et al.

[11] Patent Number: 4,860,897

[45] Date of Patent: Aug. 29, 1989

[54] DISC STORAGE DEVICE

[76] Inventors: James F. Fowler, 9209 176th St. SE., Snohomish, Wash. 98290; Nick Barker, 12115 Shorewood Dr. SW., Seattle, Wash. 98146; Steven Kaneko, 505 E. Denny Way #512, Seattle, Wash. 98122; Loyd C. Moore, 2242 100th Ave. SE., Bellevue, Wash. 98004

[21] Appl. No.: 171,375

[22] Filed: Mar. 21, 1988

[51] Int. Cl.⁴ ............................................. B65D 1/36
[52] U.S. Cl. .................................. 206/444; 206/213; 360/133; 369/291
[58] Field of Search ............... 206/444, 455, 555, 556, 206/312, 313; 360/133; 369/291

[56] References Cited

U.S. PATENT DOCUMENTS

| | | | |
|---|---|---|---|
| 4,202,122 | 5/1980 | Namiki | 206/456 |
| 4,533,049 | 8/1985 | Ozeki | 206/472 |
| 4,588,321 | 5/1986 | Egly | 206/444 |
| 4,705,166 | 11/1987 | Ackeret | 206/444 |
| 4,724,956 | 2/1988 | Ozeki | 206/456 |

OTHER PUBLICATIONS

*Primary Examiner*—Stephen P. Garbe
*Attorney, Agent, or Firm*—Russell W. Illich

[57] ABSTRACT

A disc storage device for holding and storing discs such as computer floppy discs, compact discs, slides and the like. The device comprises a set of modules for holding the discs having a planar surface, four walls surrounding the planar surface holding means to prevent the disc from moving within the module and ejector means for easy removal of the disc from the module. The device may include 12 modules arrayed on an 8½ by 11" one-piece plastic unit which may be inserted into a ring binder notebook or inserted as a rail file in a filing cabinet.

12 Claims, 4 Drawing Sheets

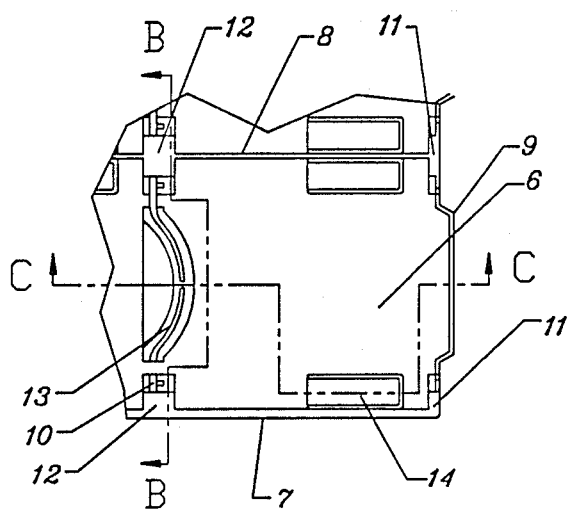
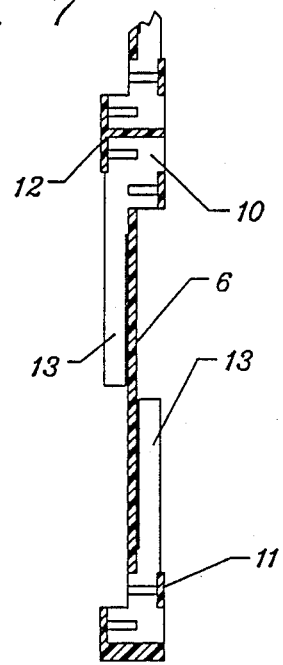
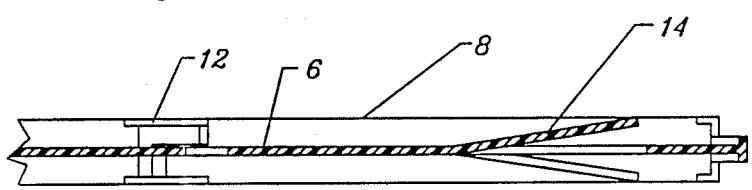
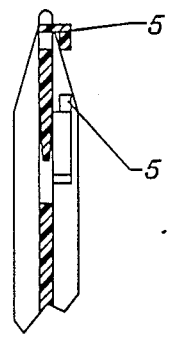

DISC STORAGE DEVICE

BACKGROUND OF THE INVENTION

The invention relates to a module for holding and storing computer floppy discs, audio compact discs and other small disk-like storage media such as photographic slides. The invention finds its greatest use in holding and storing magnetic media storage devices, such as 3½" computer floppy discs in a format which allows the storage of 12 discs on a standard 8½ by 11" page format in either a 3 ring binder notebook form or a standard 12" rail hanging file drawer.

The proliferation of the 3½" computer floppy disc as a means for data storage has resulted in a number of storage devices with which to organize and store the discs during non-use and transportation. The storage devices currently used can be classified in one of three categories: (1) soft, page oriented storage; (2) hard, file oriented storage; and (3) customized notebook oriented storage. The disadvantage of the 1st type is that the discs are difficult to remove, they fall out if the page is inverted, they fall out if the notebook is dropped, the pages tend to flop around due to a lack of rigidity, and the pages can easily be torn or otherwise destroyed. The disadvantages of the 2nd type of storage device is that transportability is awkward since the boxes are not easily carried or fit into a briefcase, suitcase, etc., only one disc at any one time is visible as a user pages through the filed discs, if the box is dropped in its open position all of the discs fall out, and the entire box can be stolen and offers security only if placed inside a locked desk drawer. The third type of storage device has the disadvantage of higher costs associated with storage since a customized notebook must additionally be purchased, storage is limited since the notebooks are smaller than the standard 9 by 12" size, and internal space is not optimized within the devices.

SUMMARY OF THE INVENTION

The invention disclosed herein solves the problems associated with the three types of storage devices. Specifically, the invention discloses a one-piece molded plastic module comprised of a planar surface and four perpendicular walls for holding the disc-like storage media in place. It further comprises means to easily eject the disc from the module. The module fits into a standard 8½ by 11" page format or a 12" rail hanging file storage format.

One objective of the invention is to provide a disc storage device which securely holds the disc(s) in place without rattling or fear of dropping out of the device.

Another object of the invention is to provide a device which allows easy removal of the disc(s) from the device.

Yet, another object of the invention is to provide a device which is adaptable in both a standard 8½ by 11" page format or a 12" rail hanging file format.

Additional objects of the invention will become evident upon reading of the specification and claims with respect to the drawings, all appended hereto.

BRIEF DESCRIPTION OF THE DRAWINGS

FIG. 4 is sectional view along the line A—A of FIG. 1.

FIG. 5 is a cutaway view of a single module of the device shown in FIG. 1.

FIG. 6 is a sectional view along the line B—B of the module depicted in FIG. 5.

FIG. 7 is a sectional view along the line C—C of the module depicted in FIG. 5.

DETAILED DESCRIPTION OF THE INVENTION

Figure 1:
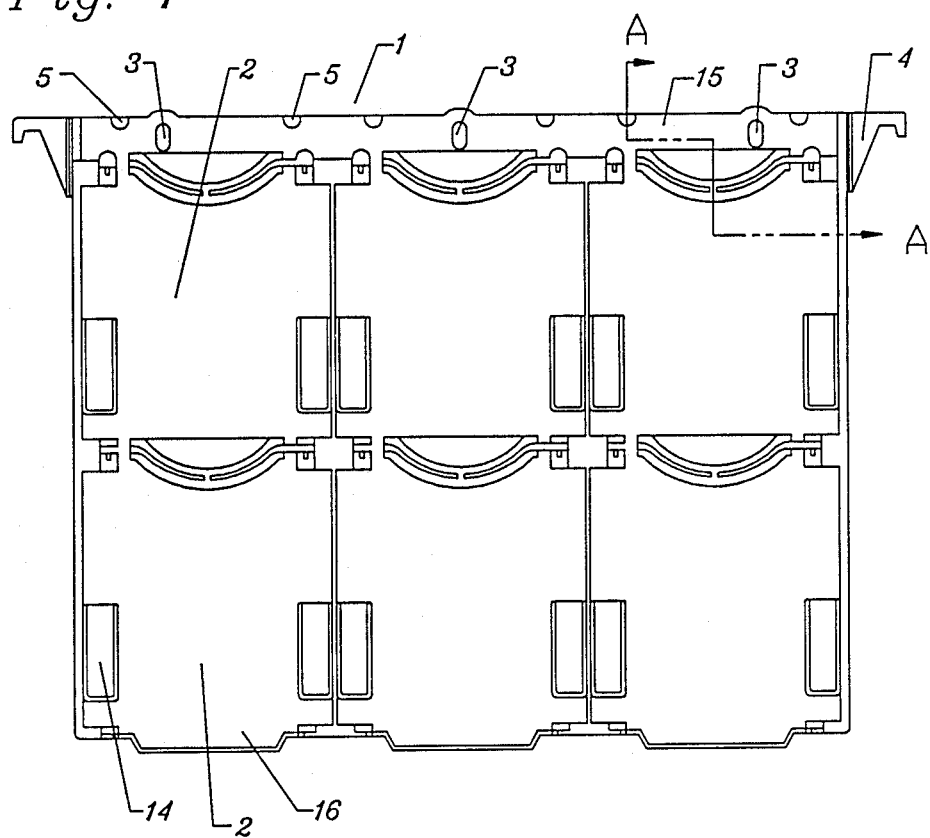
FIG. 1 is a plan view of the disc storage device on an 8½" by 11" page or a 12" file format.

The disc storage device is shown generally in FIG. 1 by the numeral 1. The device comprises individual modules 2 for holding discs. There are six modules on the front side of the device and six additional modules (not shown) on the back side of the device that are capable of holding 12 discs total. The device is capable of being stored in a standard 3 ring notebook in 8½ by 11" page format through provision of three perforated ring holes along an edge 15 of the device. Furthermore, the device is capable of being stored in a file cabinet through the provision of hooks 4 along edge 15 which conform to standard 12" rail hanging file form for easy filing. The hooks may be broken off if the device is strictly to be used in a 3 ring notebook. The device is further provided with integral tabs 5 along edge 15 which are capable of holding a label for identifying the individual discs which are stored within the device. FIG. 4 clearly shows a cross-sectional view of these tabs which are arranged opposite from each other to hold a label in place. Also, adhesive backed labels may be inserted into recesses 16 along th opposite edge from edge 15 (or right hand edge as viewed in FIG. 1).

FIGS. 5-7 clearly show the features of an individual module 2 for holding a pair of discs (one on either side) within the device. The module 2 comprises a planar surface 6 and four opposing perpendicular walls 7, 8, 9, and 10 for holding a pair of discs in place. Walls 7 and 8 act as a guide for inserting a disc into the module and constrain the disc's movement in an up an down direction relative to the page as shown in FIG. 5. Walls 9 and 10 hold and constrain the disc from movement in a right or left direction relative to the page as shown in FIG. 5. Clips 11 and 12 extending outwardly from walls 9 and 10, respectively, further restrain the disc from moving in a direction out of the page as shown in FIG. 5. The disc is held firmly within the module through the provision of a leaf spring 13 extending outwardly from wall 10 and presentation spring 14 extending outwardly from the planar surface 6. Leaf spring 13 forces the disc to lie firm against wall 9 while presentation spring 14 forces the disc to lie firmly against clips 11 and 12.

Figure 8:
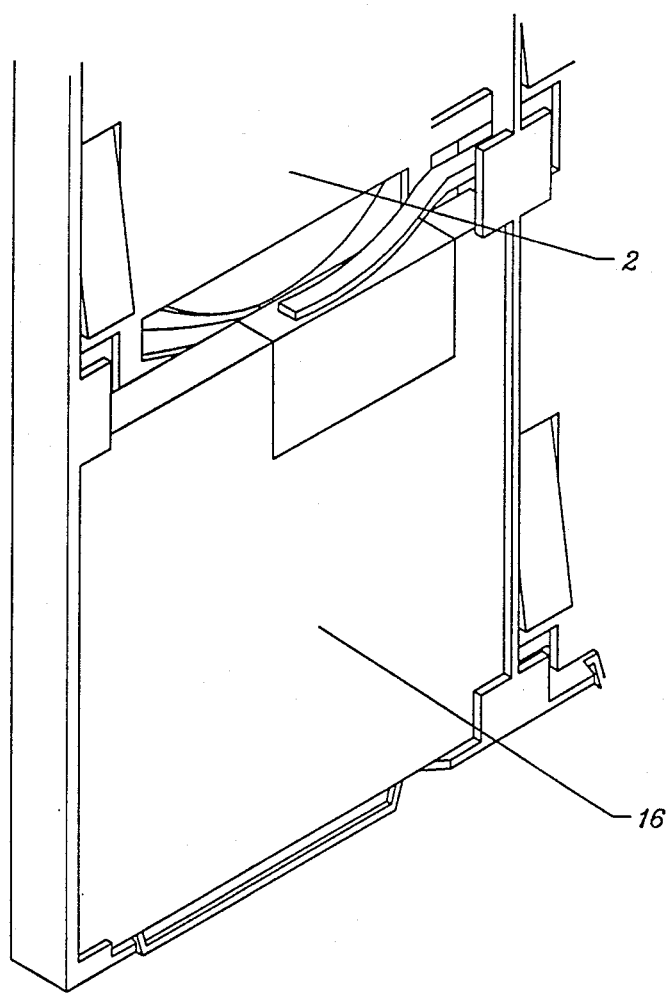
FIG. 8 is a perspective view of a module and disc of the invention.

In operation, a disc 17 is inserted into a module as shown in FIGS. 5 and 8 by sliding one edge of the disc along the planar surface 6 and beneath the pair of clips 12. As the disc is slid beneath the clips, the disc's edge presses against leaf spring 13. Once the disc is pushed all the way against wall 10 it may be pushed downwardly against presentation spring 14. In pushing the disc downwardly the disc's opposite edge clears the edges of clips 11 on wall 9. Once the disc lies firmly against planar surface 6, then leaf spring 13 forces the disc back beneath the clips 11 and the disc is stored. In this position the disc 17 is firmly held in place, as shown in FIG.

8, and will not rattle within the module due to pressure from springs 13 and 14. Furthermore, if the storage device is dropped the discs will not fall out due to clips 11 and 12 holding the disc in place.

Figure 9:
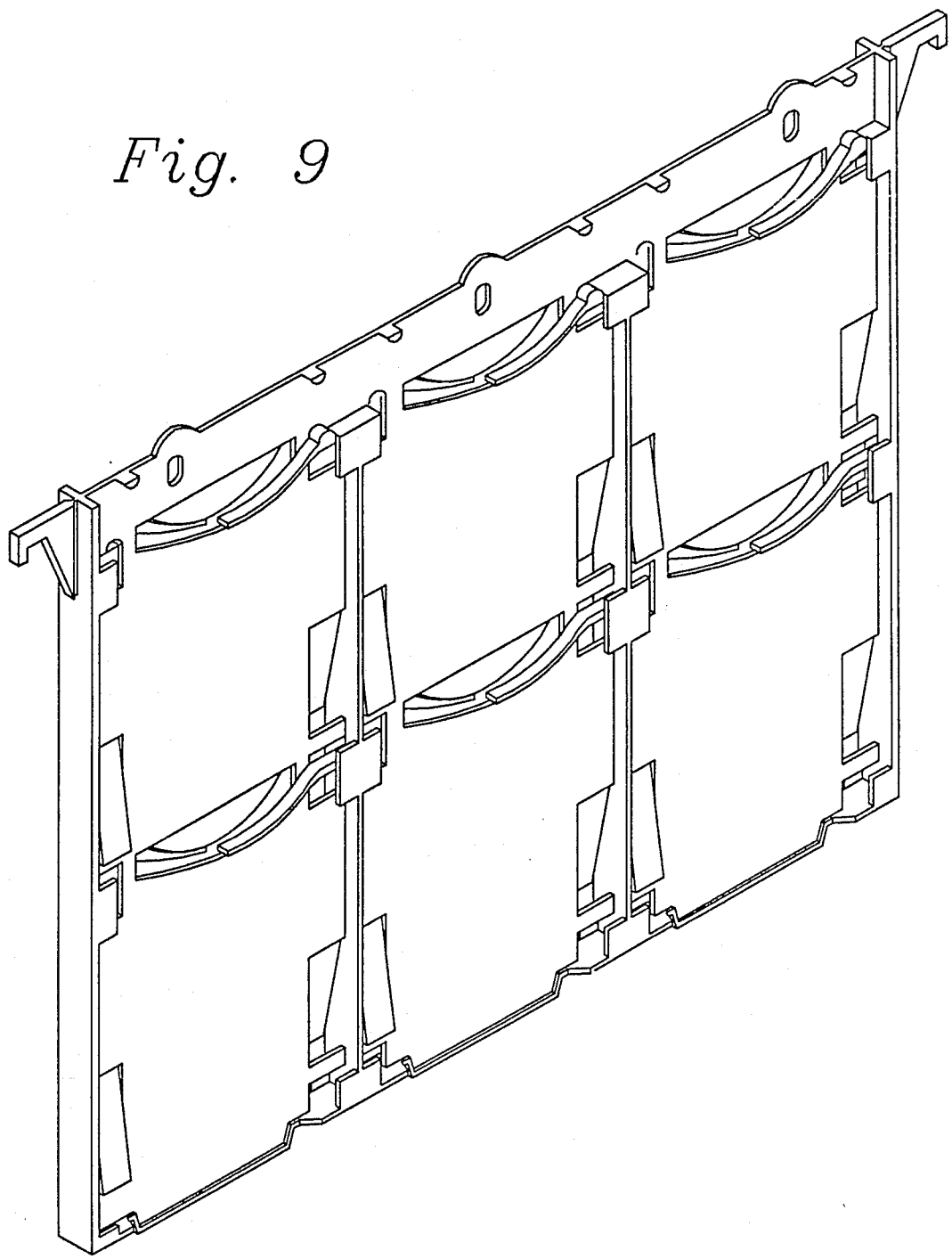
FIG. 9 is a perspective view of the disc storage device as substantially shown in FIGS. 1-3.

Removal of the disc from the module is easily facilitated by the ejector means of the module. One merely pushes on the edge of the disc adjacent to wall 9 and springs 13 and 14 automatically eject the disc up and out of the module past clips 11 and 12. The storage device has six modules on either side as shown in FIG. 1 and up to twelve discs may be inserted and removed one at a time from the twelve modules, best shown in FIG. 9, in a manner as described above.

Figure 2:
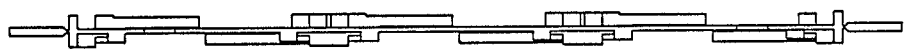
FIGS. 2 and 3 are opposite side views of the device shown in FIG. 1.
Figure 3:
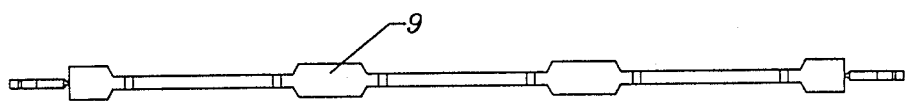

The storage device is made of one-piece molded plastic for ease in manufacturing and for low cost manufacturing. The thickness of the device is clearly shown in FIGS. 2 and 3 which is slightly greater than the thickness of a pair of discs faced back-to-back. This enables the device to be stored easily and conveniently in a 3 ring binder, and a plurality of storage devices may be stored in a medium-sized notebook due to the optimal storage of the discs within the device.

It is noted that other variation and embodiments of the disc storage device are encompassed by the scope of this invention which is to be determined by the appended claims.

What is claimed is:

1. A disc storage device for holding and storing a disc comprising, a module having a planar surface and four walls extending perpendicular to said surface, first and second walls of said four walls acting as guide means for restraining the disc as it is moved into said module, third and fourth walls of said four walls comprising lateral holding means to prevent the disc from moving in a direction perpendicularly outward from said planar surface, said module further including ejector means for removing the disc from the module in response to movement of the disc in a single direction toward said fourth wall.

2. A device as claimed in claim 1, wherein, said lateral holding means include two clips extending outwardly from said third wall and two clips extending outwardly from said fourth wall.

3. A device as claimed in claim 1, wherein, said ejector means comprises a first leaf spring extending outwardly from said fourth wall and a second leaf spring extending outwardly from said planar surface.

4. A device as claimed in claim 1, further comprising a second module forming a pair of modules with the first module, said second module extending from the opposite side of said planar surface such that a pair of discs may be stored in a back-to-back position within the pair of modules.

5. A device as claimed in claim 1, further comprising five additional modules arrayed in a planar form such that the modules lie adjacent one another in a 2 by 3 format, and are capable of holding six discs.

6. A device as claimed in claim 4, further comprising five additional pairs of modules arrayed in a planar form such that the six pairs of modules lie adjacent one another in a 2 by 3 format, and are capable of holding twelve discs.

7. The device as claimed in claim 1, wherein the device is molded as a one-piece integral unit formed of plastic.

8. The device as claimed in claim 1, further comprising a first edge along one side of the device that lies within the same plane as said planar surface of said module.

9. The device as claimed in claim 8, wherein said edge includes at least one perforated hole to enable the device to be held in a ring binder notebook.

10. The device as claimed in claim 8, wherein said edge includes a pair of hooks extending outwardly from the device to enable the device to be stored as a file in a filing cabinet.

11. The device as claimed in claim 8, wherein said edge includes a plurality of tabs for holding an identification label in place.

12. The device as claimed in claim 8, wherein said device includes a second edge opposite said first edge comprising at least one recess into which an adhesive identification label may be inserted.

* * * * *